United States Patent [19]
Brenner et al.

[11] Patent Number: 5,890,300
[45] Date of Patent: Apr. 6, 1999

[54] COORDINATE MEASURING APPARATUS HAVING A PROBE MOVABLY JOURNALLED VIA SEVERAL ROTATIONAL AXES

[75] Inventors: Kurt Brenner, Satteldorf; Karl Seitz, Oberkochen, both of Germany

[73] Assignee: Carl-Zeiss-Stiftung, Heidenheim, Germany

[21] Appl. No.: 713,501

[22] Filed: Sep. 13, 1996

[30] Foreign Application Priority Data

Sep. 16, 1995 [DE] Germany .................. 195 34 425.1

[51] Int. Cl.⁶ .................................. G01B 5/008
[52] U.S. Cl. .................. 33/503; 33/702; 33/704
[58] Field of Search .............. 33/702, 704, 503

[56] References Cited

U.S. PATENT DOCUMENTS

| | | |
|---|---|---|
| 3,077,958 | 2/1963 | Grimsey, Jr. .................... 33/702 |
| 3,311,986 | 4/1967 | Zawistowski .................... 33/702 |
| 3,334,419 | 8/1967 | Jaye .................................. 33/702 |
| 3,528,206 | 9/1970 | Baird ................................ 33/702 |
| 4,282,688 | 8/1981 | Krim . |
| 4,761,887 | 8/1988 | Brown et al. .................... 33/702 |
| 4,815,213 | 3/1989 | McCabe et al. . |
| 5,050,311 | 9/1991 | Nelle ................................ 33/704 |
| 5,095,632 | 3/1992 | Hassler, Jr. et al. ............ 33/704 |
| 5,396,712 | 3/1995 | Herzog . |
| 5,402,582 | 4/1995 | Raab . |

*Primary Examiner*—Christopher W. Fulton
*Attorney, Agent, or Firm*—Walter Ottesen

[57] ABSTRACT

The invention is directed to a coordinate measuring apparatus wherein the influences of temperature on the measuring uncertainty of the apparatus are eliminated. Components of the two pivot arms, which determine the spacing A of the rotational axes (6, 8) and the spacing of the rotational axis 8 to the probe axis 10, are made of materials having positive and negative thermal expansion coefficients.

5 Claims, 2 Drawing Sheets

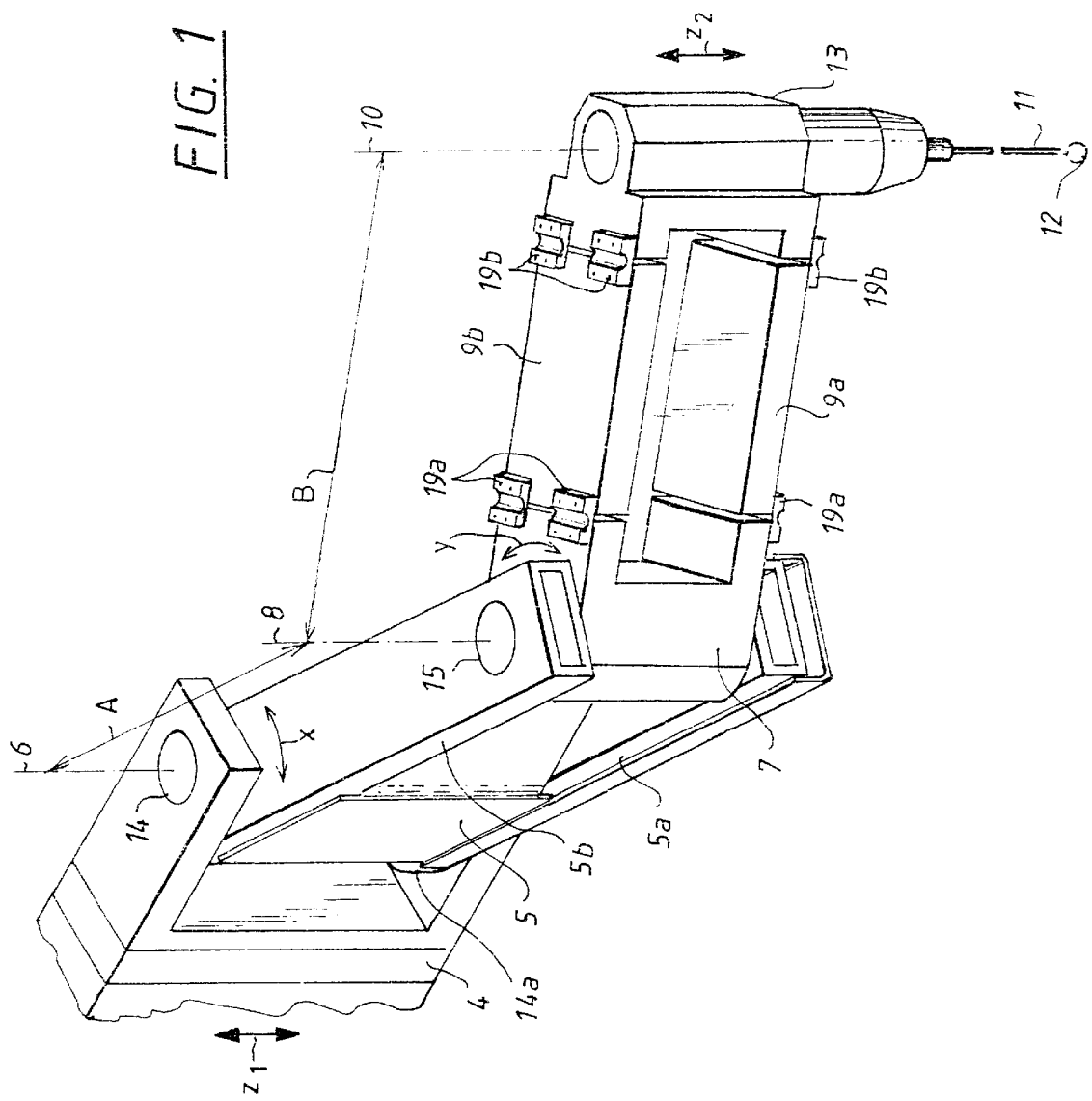

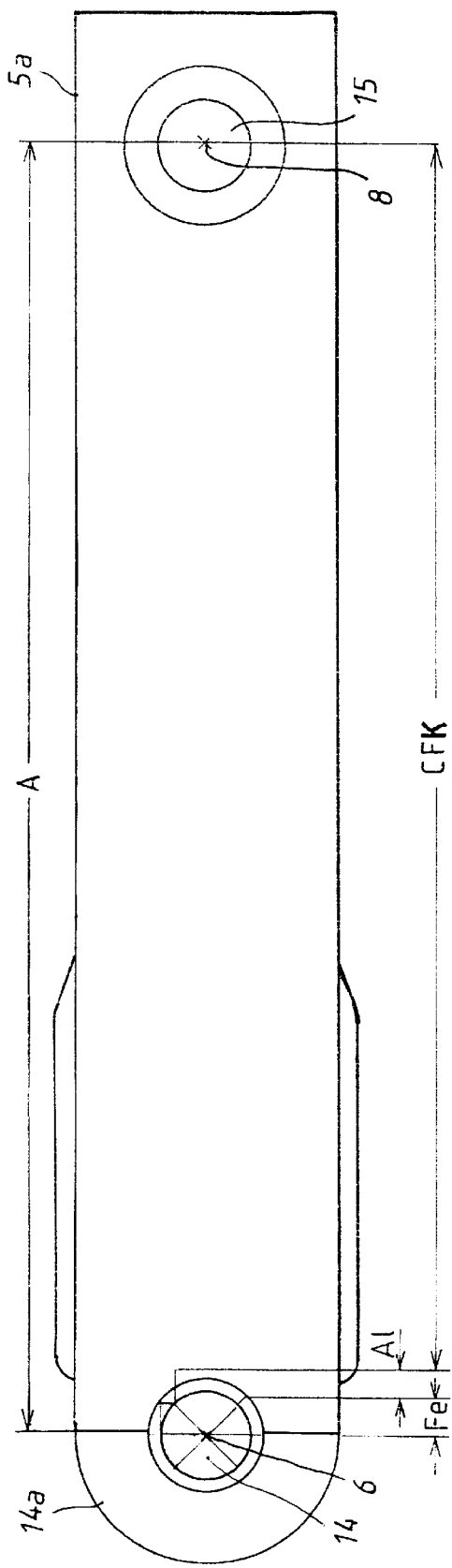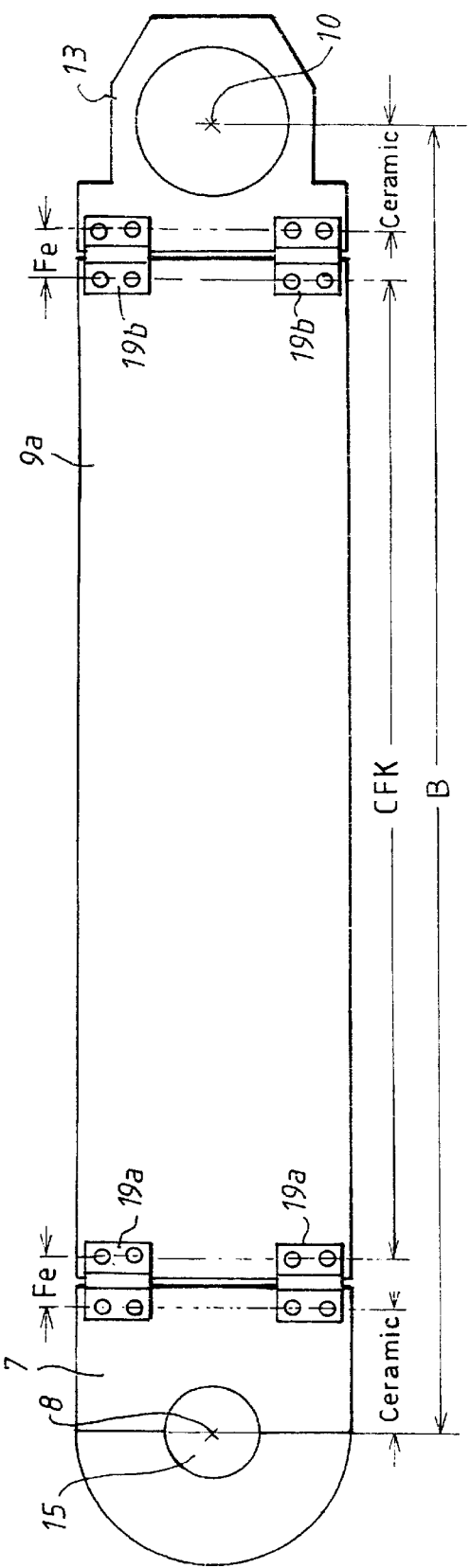

COORDINATE MEASURING APPARATUS HAVING A PROBE MOVABLY JOURNALLED VIA SEVERAL ROTATIONAL AXES

FIELD OF THE INVENTION

The invention relates to a coordinate measuring apparatus having a probe which is movably journalled via rotational axes which are connected one behind the other.

BACKGROUND OF THE INVENTION

In such hand-guided coordinate measuring apparatus, the probe can be guided more or less freely in space or in a plane by the operator in dependence upon the number and position of the rotational or pivot axes and can be placed on the workpiece to be measured. Coordinate measuring apparatus of this kind are described, for example, in U.S. Pat. Nos. 5,402,582 and 5,396,712.

In coordinate measuring apparatus of this type, the spacings of the rotational axes from each other must be precisely known because these spacings and the rotational angles, which are supplied by encoders mounted on the rotational axes, determine the position of the probe in space. The same applies to the spacing of the last rotational axis to the position of the probe or to the position of the axis of the probe pin to which the probe ball is attached.

Temperature has a great influence on the measuring accuracy of these apparatus because the spacing of the pivot axes can change as a consequence of the thermal longitudinal expansion of the arms connecting the joints. For this reason, the apparatus disclosed in U.S. Pat. No. 5,402,582, which is primarily made of aluminum, is provided with temperature sensors in order to detect the thermal longitudinal expansion via a temperature measurement. The position of the probe ball in space can then be corrected via a corresponding correction computation while considering the signals supplied by the temperature sensors.

This solution, however, is complex and subjected to disturbances because of the required additional sensors and computation operations.

With respect to the apparatus described in U.S. Pat. 5,396,712, it is noted that the movable parts can, for example, be made of carbon-fiber-reinforced plastic (CFK) which combines a very low mass at high stability of the assembly with simultaneous insensitivity with respect to thermal effects. However, CFK has no negligible thermal expansion coefficient. Rather, this expansion coefficient is anisotropic, that is, it is dependent upon the alignment of the fibers or, more specifically, how the particular component is wound or cut with respect to the fibers. In dependence thereon, the thermal expansion coefficient of CFK lies between $-3 \cdot 10^{-6}/K$ and approximately $+23 \cdot 10^{-6}/K$ which for lever lengths of one meter means length changes of between $-30$ and $+230$ $\mu$m in a temperature interval of $10°$. This amount is significant with respect to measurement uncertainty when high requirements are imposed on measuring precision.

SUMMARY OF THE INVENTION

In view of the foregoing, it is an object of the invention to provide a coordinate measuring apparatus of the kind described above wherein the spacing of the rotational axes with respect to each other remains as constant as possible over a large temperature range.

A coordinate measuring apparatus includes the following parts: a first pivot joint defining a first pivot axis; a second pivot joint defining a second pivot axis; a probe unit defining a probe axis; a first component interconnecting the first and second pivot joints; a second component interconnecting the second pivot joint and the probe unit; the parts determining a first distance (A) between the first pivot axis and the second pivot axis and a second distance (B) between the second pivot axis and the probe axis; at least one of the parts including a material having a positive thermal expansion coefficient; and, at least one of the parts including a material having a negative thermal expansion coefficient.

According to the invention, the various parts of the apparatus are made of different materials having positive and negative thermal expansion coefficients. These parts determine the spacing of the rotational axes to each other and the spacing of a rotational axis to the probe axis. In this way, and by a suitable selection of effective lengths in the direction of the spacing of the axis and with a suitable selection of the materials, the spacings experience only slight thermal changes in length (negligible in the context of the measuring precision of the apparatus); that is, the geometry of the apparatus remains constant over a wide temperature range. Accordingly, additional temperature sensors are unnecessary.

Advantageously, at least one of the parts comprising fiber-reinforced plastic, preferably a carbon-fiber-reinforced plastic (CFK), which has a negative thermal coefficient of expansion in the direction of the spacing between the axes. This can, for example, be achieved in that the particular components are cut from the material in a corresponding orientation or, when the components are individually polymerized, the fibers reinforcing the plastic are wound in the required orientation.

BRIEF DESCRIPTION OF THE DRAWINGS

The invention will now be described with reference to the drawings wherein:

FIG. 1 is a simplified perspective schematic of the movable parts of a coordinate measuring apparatus wherein the rotational axes are arranged one behind the other;

FIG. 2 shows the leg 5a of FIG. 1, in an enlarged scale, with the view being in the direction of the longitudinal axis 10 of the probe; and, FIG. 3 is a plan view, in an enlarged scale, of the components of the apparatus, which connect the rotational axis 8 and the longitudinal axis 10 of the probe, with this view likewise being in the direction of the longitudinal axis 10 of the probe.

DESCRIPTION OF THE PREFERRED EMBODIMENTS OF THE INVENTION

The description of FIG. 1 assumes a coordinate measuring apparatus of the type described, for example, in U.S. Pat. No. 5,396,712 referred to above and incorporated herein by reference. The machine base of this apparatus with the workpiece table and the vertical Z-column are not shown in FIG. 1. A fork-shaped carrier 4 made of steel is made to vertically track with the aid of a motor in the direction of arrow $z_1$.

Bearings are provided in both legs of the carrier 4 for a shaft 14 connecting the legs. This shaft 14 then defines a first vertical rotational axis 6. A first arm 5 is attached to the shaft 14 so that it can pivot horizontally as indicated by arrow x.

The angular measuring system required to detect the pivot movement is not shown in FIG. 1 for the sake of clarity.

The pivot arm 5 likewise has a fork-shaped configuration. The ends of the legs (5a and 5b) of the fork-shaped pivot arm support the bearings for a second shaft 15. This shaft defines the second rotational axis 8 which is at a spacing A to the first rotational axis 6 and is aligned parallel thereto. A second pivot arm is attached to the shaft 15 and is rotatable about the axis 8 as indicated by arrow y.

This second pivot arm comprises three parts and is configured in the form of a spring parallelogram in order to be able to manually deflect the carrier 13 in the vertical direction as indicated by arrow $z_2$. The carrier 13 is provided for the probe of the apparatus and is mounted at the forward end of the second pivot arm. The probe carries a probe pin 11 having probe ball 12 at its lower end and the probe pin 11 is journalled so as to yield.

The spring parallelogram is realized by two parallelly arranged legs (9a and 9b). Each of the legs has a first end provided with a pair of joint springs 19a which connect the first end to a leg of the part 7 and a second end which is provided with a further pair of joint springs 19b for connection to one of the two ends of the carrier 13. The part 7 is located between the legs 5a and 5b of the first pivot arm and is journalled on the shaft 15.

For coordinate measurements of workpieces with this apparatus, it is especially important that the spacing A between the two rotational axes 6 and 8 and that the spacing B between rotational axis 8 and probe pin longitudinal axis 10 remain constant during the measurement operation because the precise position of the probe ball 12 to be computed is dependent upon these lengths.

In order to ensure the foregoing also for a larger temperature range, the measures described below are taken.

As shown in the enlarged view of the lower side of the first pivot arm 5, the leg 5a of the pivot arm is made of carbon-fiber-reinforced plastic (CFK) having fibers which are so aligned that a thermal expansion coefficient $\alpha 1 = -0.8 \cdot 10^{-6}$ $K^{-1}$ results in the direction of the length A connecting the two axes 6 and 8. The effective length L1 of this part 5a, which is important for the thermal expansion, is 237.7 mm. In contrast, the shaft 14 as well as the part 4 are made of steel with a thermal expansion coefficient $\alpha 2$ of approximately $10 \cdot 10^{-6}$ $K^{-1}$. In this way, it is ensured that the shaft and the bearings do not become clamped when temperature changes take place. For this reason, no forces destroying the bearings can act thereon. The effective length L2 is that length with which the shaft 14 contributes to the linear expansion of the pivot arm. This effective length L2 is 7.1 mm.

The shaft 14 is attached to the CFK-part 5a via the part 14a. This part 14a is made of aluminum having a thermal expansion coefficient of $24 \cdot 10^{-6}$ $K^{-1}$ and contributes effectively to the thermal linear expansion with a length L3=5.2 mm. The bearings for the shaft 15 are seated at the other end of the part 5a and the shaft 15 is made of ceramic material. This material, however, is not to be considered at this point with respect to the distance A between the axes 6 and 8 or the thermal linear expansion thereof because the bearing center point remains centered independently of the type of material of the bearing and shaft.

For the thermal linear expansion 11' of the spacing A, the following therefore results:

$$11' = \alpha 1 \cdot L1 + \alpha 2 \cdot L2 + \alpha 3 \cdot L3 \quad (1)$$

which, for the example described, means the following:

$$11' = (237.7 \cdot -0.8 + 7.1 \cdot 10 + 5.2 \cdot 24) \; 10^{-6} \text{ mm } K^{-1} = 5.64 \cdot 10^{-6} \text{ mm } K^{-1} \quad (2)$$

From the above, it is apparent that the distance A changes only by approximately 0.16 μm even over a temperature range of 30° K. This slight change is completely negligible in the context of the measuring accuracy of the apparatus shown in FIG. 1.

The relationships are similar in the second pivot arm shown in FIG. 3. Here, the thermal expansion coefficient $\alpha 4$ of the shaft 15, which is made of ceramic, is $1.5 \cdot 10^{-6}$ $K^{-1}$. The part 7 surrounds the shaft 15 and is likewise made of ceramic material. For the thermal expansion of the distance B between the rotational axis 8 and the probe axis 10, the distance L4 between the center point of the shaft 15 and the attachment points of the bending springs 19a on part 7 is to be considered for the part 7. This distance L4 is 23.6 mm. The probe holder 13 likewise comprises ceramic material and has an effective length L14 of 20.5 mm which is to be considered for the thermal expansion.

The two legs 9a and 9b of the spring parallelogram are made of the material CFK having a negative thermal expansion coefficient of $-0.8 \cdot 10^{-6}$ $K^{-1}$ in the direction of distance B. The length L11 to be considered is 186 mm.

The steel springs 19a and 19b make a contribution with their effective length L12 of 10 mm in each case between the attachment points.

The following results for the thermal expansion 12' of the second pivot arm:

$$12' = L11 \cdot \alpha 1 + 2 \cdot L12 \cdot \alpha 2 + (L4 + L14) \cdot \alpha 4. \quad (3)$$

With the values important for this example, the following is obtained:

$$12' = (186 \cdot -0.8 + 2 \cdot 10 \cdot 10 + (13.6 + 20.5) \cdot 1.5) \; 10^{-6} \text{ mm } K^{-1} = 95.5 \cdot 10^{-6} \text{ mm } K^{-1} \quad (4)$$

The thermal expansion of the distance B between the rotational axis 8 and the probe axis 10 amounts to a total of 2.86 μm over a temperature range of 30° K which is likewise still negligible in the context of the measuring accuracy of the apparatus. A somewhat better result is obtained by shortening the bending springs 19 made of steel and lengthening the CFK parts (9a/9b).

The center portion of the first pivot arm 5 which connects the two legs 5a and 5b is likewise made of carbon-fiber-reinforced plastic. However, this center portion is so wound with respect to the position of the carbon fibers, which reinforce the plastic, that a positive thermal expansion coefficient $\alpha 1'$ of approximately $+1 \cdot 10^{-6}/K$ results for a simultaneous good stability of the portion in the direction of the first pivot axis 6. In this way, the spacing of the legs 5a and 5b of the first pivot arm have the same order of magnitude of thermal expansion characteristic as the shaft 15 of ceramic material so that, also at this location, no destroying forces are applied to the bearings of the shaft 15 as a consequence of thermal expansion.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus comprising:

a first pivot joint part defining a first pivot axis;

a second pivot joint part defining a second pivot axis;

a probe unit carrier part defining a probe axis;

a first component interconnecting said first and second pivot joint parts;

a second component interconnecting said second pivot joint part and said probe unit carrier part;

said first pivot joint part, said second pivot joint part and said first component conjointly determining a first distance (A) between said first pivot axis and said second pivot axis;

said second pivot joint part, said probe unit carrier part and said second component conjointly determining a second distance (B) between said second pivot axis and said probe axis;

said parts being made of at least one material having a first thermal expansion coefficient;

said components being made of at least one material having a second thermal expansion coefficient; and, one of said first and second thermal expansion coefficients being positive and the other one of said first and second thermal expansion coefficients being negative.

2. The coordinate measuring apparatus of claim 1, said parts and components having respective effective lengths; and, said lengths and the thermal expansion coefficients of the parts and said components being so selected that said first and second distances (A and B) experience only slight thermal changes in length which are negligible when viewed in the context of the measuring accuracy of said apparatus.

3. The coordinate measuring apparatus of claim 2, wherein said components comprise fiber reinforced plastic having said negative thermal expansion coefficient in the direction of the distance corresponding thereto.

4. The coordinate measuring apparatus of claim 3, wherein said parts comprise steel and/or aluminum and/or ceramic material having said positive thermal expansion coefficient.

5. The coordinate measuring apparatus of claim 1, each of said first and second pivot joint parts including: a carrier having first and second legs; first and second bearings mounted in said first and second legs, respectively; and, a shaft rotatably journalled in said bearings; and, the shaft of each pivot joint being made of a material having a thermal expansion coefficient in axial direction having the same order of magnitude as the thermal expansion coefficient of the carrier.

* * * * *